US010320463B2

United States Patent
Khan

(10) Patent No.: US 10,320,463 B2
(45) Date of Patent: Jun. 11, 2019

(54) SYSTEMS AND METHODS FOR DIGITAL AND ANALOG BEAMFORMING IN WIRELESS COMMUNICATIONS

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 15/784,023

(22) Filed: Oct. 13, 2017

(65) Prior Publication Data

US 2018/0351619 A1 Dec. 6, 2018

Related U.S. Application Data

(60) Provisional application No. 62/514,553, filed on Jun. 2, 2017.

(51) Int. Cl.
*H04B 7/08* (2006.01)
*H04B 7/06* (2006.01)
*H04W 88/10* (2009.01)
*H01Q 3/26* (2006.01)
*H04J 11/00* (2006.01)
*H04B 7/0413* (2017.01)

(52) U.S. Cl.
CPC ......... *H04B 7/0617* (2013.01); *H01Q 3/2605* (2013.01); *H04B 7/0413* (2013.01); *H04B 7/0848* (2013.01); *H04B 7/0874* (2013.01); *H04B 7/0897* (2013.01); *H04J 11/00* (2013.01); *H04W 88/10* (2013.01)

(58) Field of Classification Search
CPC .......................... H04B 7/0413; H04B 7/0617; H04B 7/0897; H04J 11/00; H01Q 3/2605; H04W 88/10
See application file for complete search history.

(56) References Cited

U.S. PATENT DOCUMENTS

| 2011/0305263 | A1* | 12/2011 | Jongren | H04B 7/0617 375/219 |
| 2012/0128038 | A1* | 5/2012 | Crilly, Jr. | H04B 7/10 375/211 |
| 2013/0301422 | A1* | 11/2013 | Caretti | H04B 1/1027 370/241 |
| 2013/0315184 | A1* | 11/2013 | Kim | H04W 72/0406 370/329 |

(Continued)

*Primary Examiner* — Curtis A Alia
(74) *Attorney, Agent, or Firm* — Michael A. Rahman

(57) ABSTRACT

A communication system includes a radio base station configured to transmit and receive signals using digital beamforming. The system includes a plurality of wireless communication devices configured to communicate with the radio base station. The wireless communication device includes a digital beamforming module configured to generate digitally pre-coded spatial streams. A pre-coding matrix is applied to a plurality of spatial streams to generate the digitally pre-coded spatial streams. The communication device includes a plurality of analog beamforming modules configured to measure signal and channel quality metrics from received packets and to calculate gain and phase adjustment values. The analog beamforming modules adjust the gain and phase of the digitally pre-coded spatial streams for analog beamforming. The communication device includes a plurality of antenna arrays configured to transmit the spatial streams.

24 Claims, 13 Drawing Sheets

(56) References Cited

U.S. PATENT DOCUMENTS

2016/0269093 A1* 9/2016 Seol ................. H04B 7/043
2017/0086211 A1* 3/2017 Sahin ................ H04W 74/04
2017/0331670 A1* 11/2017 Parkvall ............ H04J 11/0079

* cited by examiner

SYSTEMS AND METHODS FOR DIGITAL AND ANALOG BEAMFORMING IN WIRELESS COMMUNICATIONS

CROSS-REFERENCE TO RELATED APPLICATION

This application claims priority to U.S. Provisional Patent Application No. 62/514,553, filed Jun. 2, 2017 and entitled "A WIRELESS SYSTEM USING DIGITAL AND ANALOG BEAMFORMING" which is hereby incorporated by reference in its entirety.

BACKGROUND

The invention relates to wireless communications, and in particular the invention relates to systems and methods for digital and analog beamforming in wireless communications.

DESCRIPTION OF THE RELATED ART

Current wireless communication systems are based on two popular standards: a wide area network (WAN) standard referred to as The Fourth Generation Long Term Evolution (4G LTE) system; and a local area network (LAN) standard called Wi-Fi. Wi-Fi operates on shared or unlicensed spectrum as short-range wireless extension of wired broadband systems. The 4G LTE systems on the other hand provide wide area long-range connectivity using licensed spectrum and dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications.

TABLE 1

Examples of millimeter wave bands

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
|  | 29.1-29.25 | 0.150 |
|  | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
|  | 42.0-42.5 | 0.500 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

Table 2 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum.

TABLE 2

Examples of FR1 bands in 3GPP

| 5G-RAN Frequency Band | Uplink Frequency band | Downlink Frequency band | Duplex Mode |
|---|---|---|---|
| n1 | 1920 MHz-1980 MHz | 2110 MHz-2170 MHz | FDD |
| n3 | 1710 MHz-1785 MHz | 1805 MHz-1880 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n41 | 2496 MHz-2690 MHz | 2496 MHz-2690 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n77 | 3300 MHz-4200 MHz | N/A | TDD |
| n78 | 3300 MHz-3800 MHz | N/A | TDD |
| n79 | 4400 MHz-5000 MHz | N/A | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

BRIEF SUMMARY

According to disclosed embodiments, a communication system includes a radio base station configured to transmit and receive signals using digital beamforming. The system includes a plurality of wireless communication devices configured to communicate with the radio base station. The wireless communication devices are configured to transmit and receive signals using analog and digital beamforming.

According to some disclosed embodiments, the wireless communication device includes a digital beamforming module configured to generate digitally pre-coded spatial streams. A pre-coding matrix is applied to a plurality of spatial streams to generate the digitally pre-coded spatial streams. The communication device includes a plurality of analog beamforming modules configured to measure signal and channel quality metrics from received packets and to calculate gain and phase adjustment values. The analog beamforming modules adjust the gain and phase of the digitally pre-coded spatial streams for analog beamforming. The communication device includes a plurality of antenna arrays configured to transmit the spatial streams.

According to some disclosed embodiments, the analog beamforming module is configured to process the packets received by the wireless communication device and in response apply control signals to adjust the gain and phase of the digitally pre-coded spatial streams for analog beamforming.

According to disclosed embodiments, the radio base station and communication devices implement multiple input multiple output (MIMO) transmit and receive antenna arrays at millimeter wave frequencies.

According to disclosed embodiments, a method for analog beamforming gain and phase control includes receiving packets by a wireless communication device and measuring signal and channel quality metrics from the received packets. The method includes calculating gain and phase adjustment values using the measured metrics. The method includes digitally pre-coding a plurality of spatial streams and adjusting the gain and phase of the digitally pre-coded spatial streams. The method includes transmitting the pre-coded spatial streams.

According to disclosed embodiments, the method includes measuring the signal and channel quality metrics for a selected array in the wireless communication device and calculating the gain and phase adjustment values for the selected array using the measured metrics. The method includes adjusting the gain and phase of the digitally pre-coded spatial stream in the selected array for analog beamforming.

DETAILED DESCRIPTION

According to disclosed embodiments, in a wireless communication network a radio base station or access point uses digital beamforming while communication devices use both digital and analog beamforming.

By forming beams in the digital domain, the base station can simultaneously form beams in different directions to serve multiple communication devices within its coverage area. According to some disclosed embodiments, the base station includes a plurality of sectors and sub-sectors, each sub-sector having a digital beamforming/MIMO module coupled to an antenna array. Since the communication device only needs to direct its beam towards a single base station sector/sub-sector, analog beam forming can be used to steer the beam direction towards the desired base station sector/sub-sector. The base station sector/sub-sector and the communication devices also rely on digital processing to support multiple MIMO (Multiple Input Multiple Output) spatial signal streams.

According to some disclosed embodiments, digital beamforming is enabled by using a sounding mechanism, which is a process performed by a transmitter to acquire Channel State Information (CSI) from each of different users by sending training symbols and waiting for receivers to provide explicit feedback containing a measure of the channel. The feedback is then used to create a weight or precoding matrix that is used to pre-code data transmission in digital beamforming.

Figure 1:
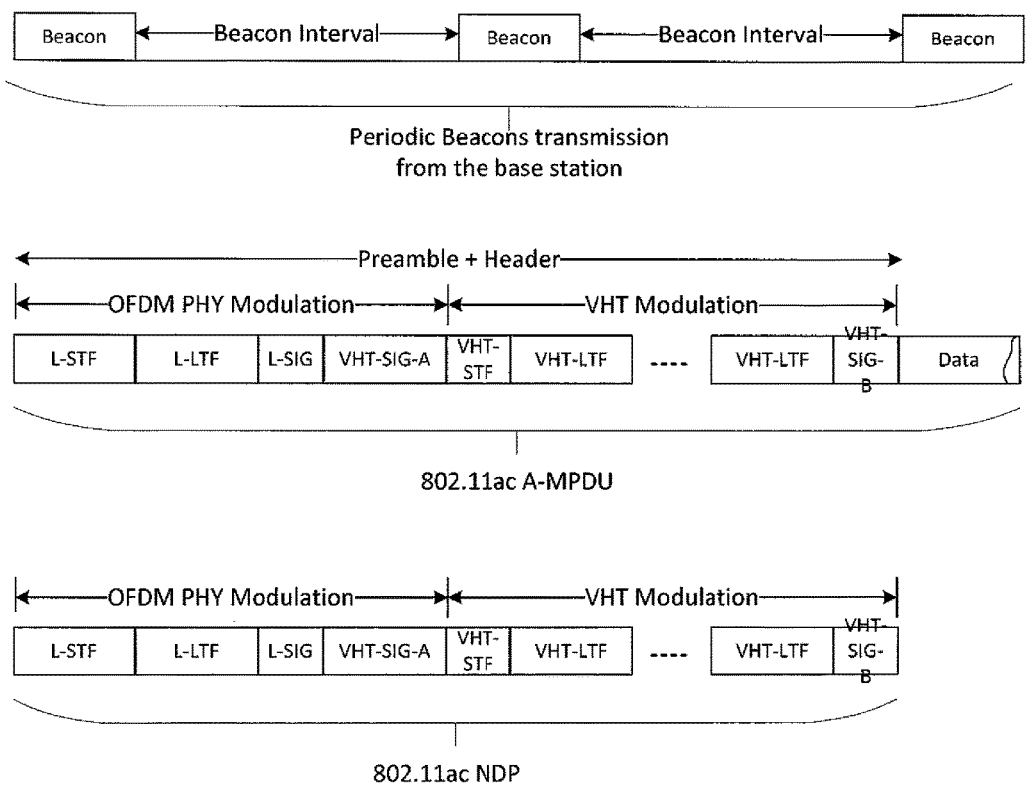
FIG. 1 illustrates a Preamble, a Header and Payload data.

According to some disclosed embodiments, a physical layer periodically transmits beacon frames to announce the presence of a wireless LAN. The transmission of data packets happens in bursts where each packet contains a Preamble, a Header and Payload data as shown in FIG. 1. The Preamble allows a receiver to obtain time and frequency synchronization and to estimate channel characteristics for equalization. A transmitter initiates a sounding feedback sequence by transmitting a very high throughout (VHT) Null Data Packet (NDP). The null data packet contains a preamble and Header without any payload data.

Figure 2A:
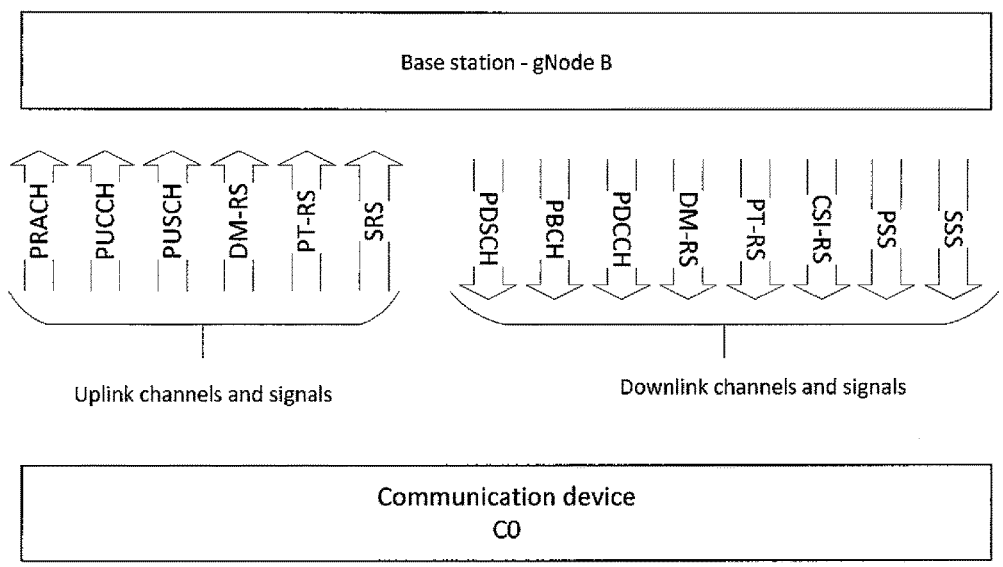
FIG. 2A illustrates signals and physical channels.

FIG. 2A illustrates uplink physical channels and uplink physical signals transmission, and downlink physical channels and downlink physical signals transmission and reception in the 3GPP 5G New Radio (NR) system according to some disclosed embodiments. An uplink physical channel corresponds to a set of resource elements carrying information originating from higher layers. The uplink physical channels transmitted from a communication device includes: Physical Uplink Shared Channel (PUSCH), Physical Uplink Control Channel (PUCCH), Physical Random Access Channel (PRACH). An uplink physical signal is used by the physical layer but does not carry information originating from higher layers. The uplink physical signals transmitted from the communication device includes: Demodulation reference signals (DM-RS), Phase-tracking reference signals (PT-RS) and Sounding reference signal (SRS).

A downlink physical channel corresponds to a set of resource elements carrying information originating from higher layers. The downlink physical channels transmitted from the radio base station includes: Physical Downlink Shared Channel (PDSCH), Physical Broadcast Channel (PBCH) and Physical Downlink Control Channel (PDCCH). A downlink physical signal corresponds to a set of resource elements used by the physical layer but does not carry information originating from higher layers. The downlink physical signals transmitted from the radio base station includes: Demodulation reference signals (DM-RS), Phase-tracking reference signals (PT-RS) Channel-state information reference signal (CSI-RS) Primary synchronization signal (PSS) and Secondary synchronization signal (SSS). The channels and signals are received by communication devices and are used to modify signal level and signal phase in gain and phase control blocks.

Figure 2B:
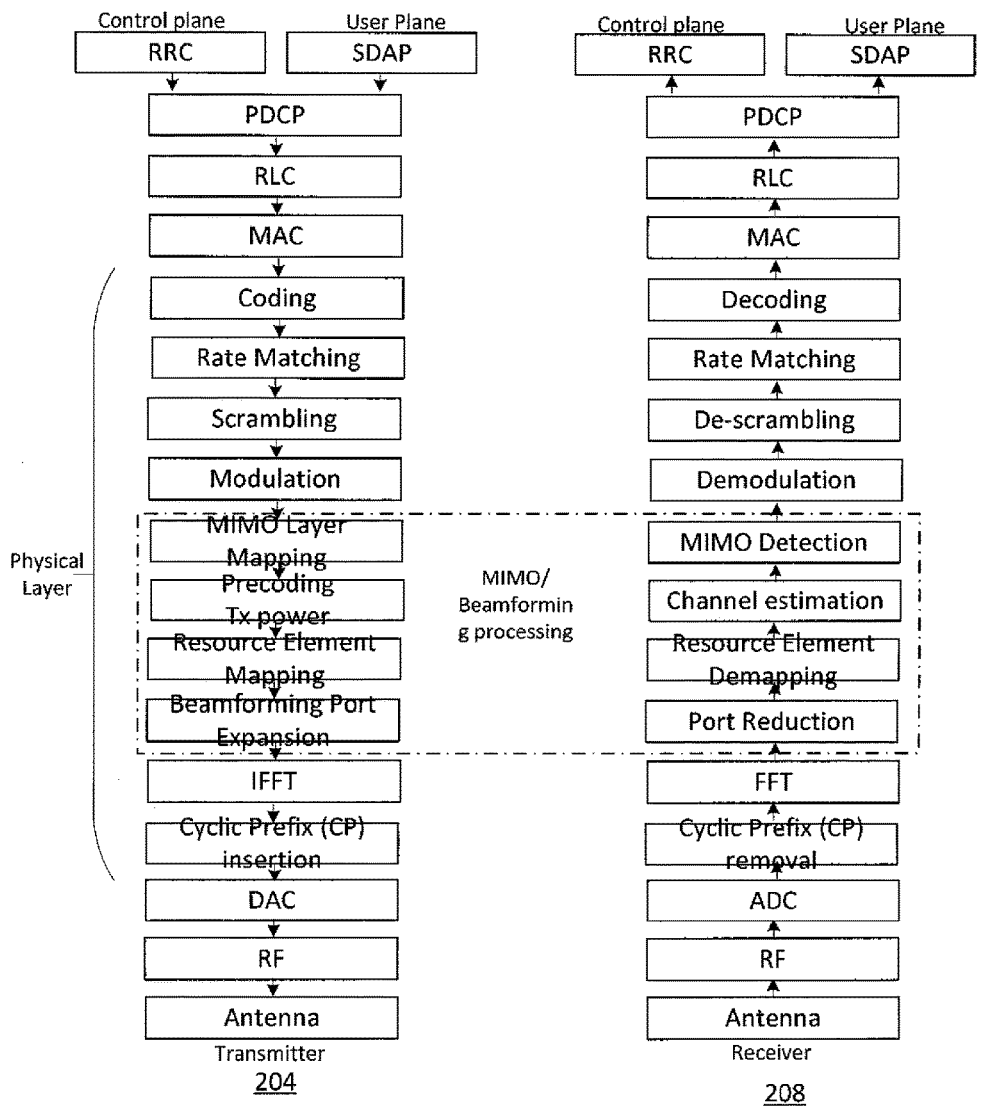
FIG. 2B is a block diagram of a transmitter and a receiver.

FIG. 2B is a block diagram of a transmitter 204 and a receiver 208 according to disclosed embodiments. The transmitter 204 and the receiver 206 includes a physical layer, a Medium Access Control (MAC), a Radio Link Control (RLC), and a Packet Data Convergence Protocol (PDCP), and a Service Data Adaptation Protocol (SDAP). A control plane includes a Radio Resource Control (RRC) on top of the PDCP layer. According to disclosed embodiments, MIMO and digital beamforming processing is done after modulation and before OFDM processing at the transmitter as part of the physical layer before digital-to-analog (DAC) conversion in the transmitter 204 and after analog-to-digital conversion (ADC) and OFDM processing in the receiver 208. As part of the OFDM processing at the transmitter 204, an Inverse Fast Fourier Transform (IFFT) operation is performed and a cyclic prefix (CP) is added to the transformed symbols. As part of the OFDM processing at the receiver 208, a cyclic prefix (CP) is removed and a Fast Fourier Transform (FFT) operation is performed to generate the modulation symbols.

According to disclosed embodiments, digital beamforming and MIMO processing consists of two steps; layer mapping and precoding as depicted in FIG. 2B. A layer is equivalent to a MIMO spatial stream, and the number of layers is equal to the number of MIMO spatial streams. A codeword is a data block that can be mapped to one or more layers. The complex-valued modulation symbols $d^{(q)}(0), \ldots, d^{(q)}(M_{symb}^{(q)}-1)$ for codeword q are mapped onto the layers $x(i)=[x^{(0)}(i) \ldots x^{(v-1)}(i)]^T$, $i=0, 1, \ldots, M_{symb}^{layer}-1$ according to the mapping shown in Table 3 where $v$ is the number of layers and $M_{symb}^{layer}$ is the number of modulation symbols per layer.

TABLE 3

Codeword-to-layer mapping in the 5G NR standard

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | $M_{symb}^{layer} = M_{symb}^{(0)}/4 = M_{symb}^{(1)}/4$ |

In the precoding step, the layer symbols $x(i)=[x^{(0)}(i) \ldots x^{(v-1)}(i)]^T$, are mapped to the antenna port symbols $y(i)=[y^{(0)}(i) \ldots y^{(P-1)}(i)]$ as below:

$$\begin{bmatrix} y^{(0)}(i) \\ \vdots \\ y^{(P-1)}(i) \end{bmatrix} = [P \times v] \times \begin{bmatrix} x^{(0)}(i) \\ \vdots \\ x^{(v-1)}(i) \end{bmatrix}$$

where $[P \times v]$ is the precoding matrix.

Figure 3:
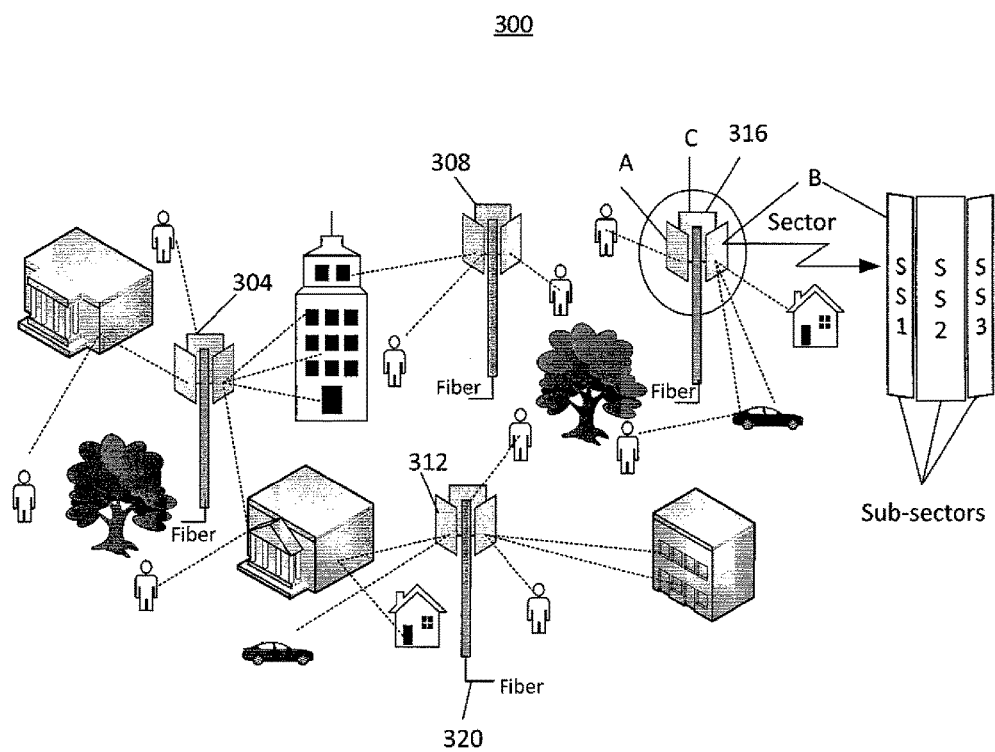
FIG. 3 illustrates a wireless communication network in accordance with disclosed embodiments.

FIG. 3 illustrates a wireless communication network 300 in accordance with disclosed embodiments. The network 300 includes radio base stations or access points 304, 308, 312 and 316 configured to provide services to a plurality of mobile and fixed wireless devices in a coverage area. The wireless devices may, for example, include mobile phones, laptop computers, desktop computers, wireless modems, customer premise equipment (CPE), and virtual reality and/or augmented reality devices. The radio base stations 304, 308, 312 and 316 provide services to many such devices outdoor and inside buildings within a coverage area.

Referring to FIG. 3, the radio base stations 304, 308, 312 and 316 are connected to a wide area network such as the Internet via a communication link 320, which may be a high-speed link such as a fiber optic link or any other communications link. The radio base stations 304, 308, 312 and 316 receive data and send data via the communication link 320.

According to disclosed embodiments, the base stations may include a plurality of sectors, each providing coverage for a zone or sector. By way of example, the base station 316 has three sectors A, B and C. Sector A provides coverage to a mobile phone user while sector B provides coverage to a residence and a vehicle. Each sector may include a plurality of sub-sectors. For example, sector B includes sub-sectors 1-3. Although the exemplary base stations are shown to have three sectors, it will be understood that the base stations may include only one sector or any suitable number of sectors.

Figure 4:
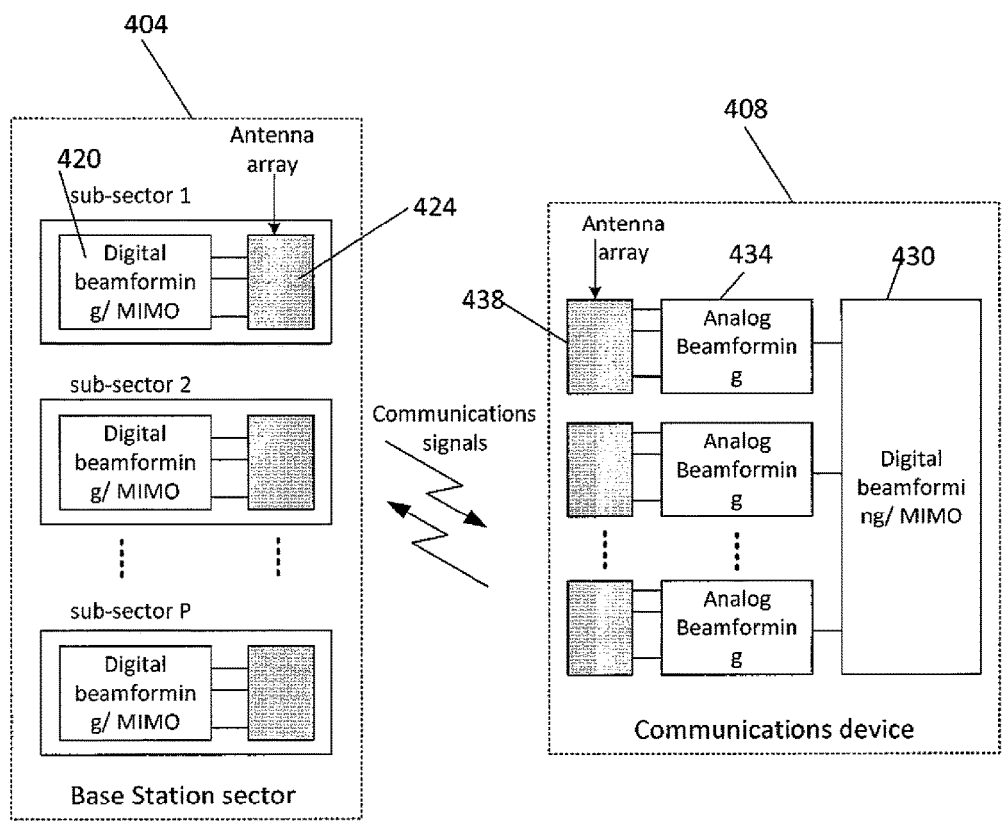
FIG. 4 illustrates a base station sector communicating with a communication device.

FIG. 4 illustrates a base station sector 404 communicating with a communication device 408. According to disclosed embodiments, the base station sector 404 is configured to form beams in the digital domain (i.e., digital beamforming) while the communication device 408 is configured to form beams in both the digital and analog domains (i.e., digital and analog beamforming).

As discussed before, a base station can provide 360 degrees coverage by using three sectors each sector covering 120 degrees. Each sector (e.g., sector 404) may be further divided into P sub-sectors with each sub-sector covering 120/P degrees. For example, for the case when a sector is further divided into three sub-sectors, each sector provides 40 degrees coverage.

Referring to FIG. 4, each sub-sector serves communication devices by forming beams in the digital domain. Each sub-sector includes a digital beamforming/MIMO module coupled to an antenna array. For example, sub-sector 1 includes a digital beamforming/MIMO module 420 coupled to an antenna array 424. The communication device 408 communicates with the sub-sector using both analog and digital beamforming. The communication device 408 includes a digital beamforming/MIMO module 430, plurality of analog beamforming modules 434 coupled to antenna arrays 438.

Figure 5:
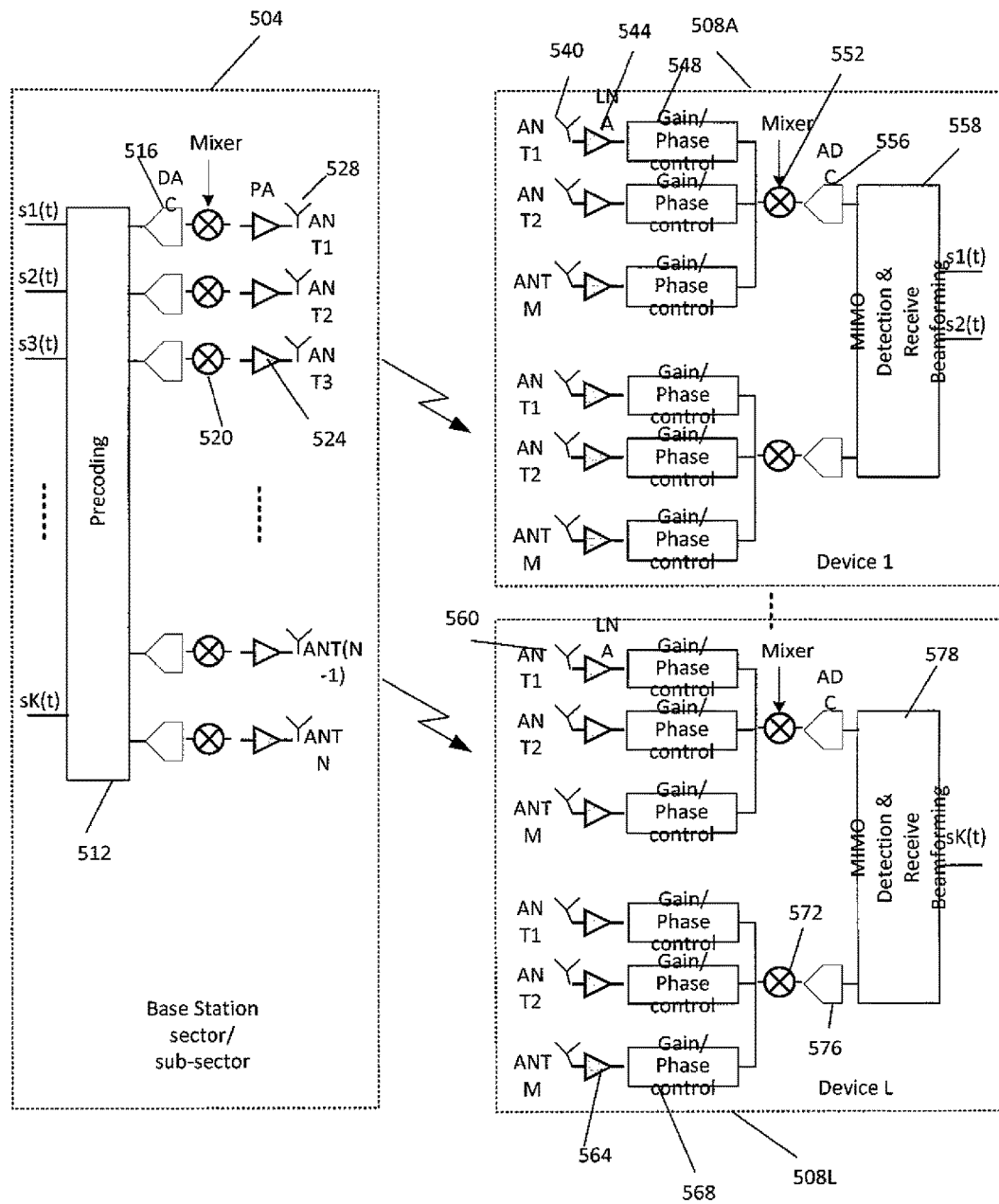
FIG. 5 illustrates a base station sub-sector transmitting signals to communication devices.

FIG. 5 illustrates an exemplary base station sub-sector 504 transmitting signals to communication devices 508A-508L using digital beamforming while the communication devices 508A-508L use both digital and analog beamforming to receive signals from the base station sub-sector 504. The base station sub-sector 504 transmits K spatial streams or layers, $s_1(t), s_2(t), \ldots s_K(t)$, to the communication devices 508A-508L using N antennas or antenna ports. A MIMO precoding processing block 512 converts K spatial streams digital signals into N digital signals for transmission over N antennas to the communication devices. A set of N Digital-to-Analog (DAC) converters 516 converts N digital signals into N analog baseband signals. These N analog baseband signals are up-converted to the RF (radio frequency) by N mixers 520. In other embodiments, the analog baseband signals are first converted into an IF (intermediate frequency) before up-conversion to RF. The RF signals are amplified by N power amplifiers 524 and are transmitted from N antennas 528.

The communication device 508A receives two spatial streams $s_1(t), s_2(t)$ using two arrays comprising of M antennas 540 each. On each array, M low-noise-amplifiers (LNA) 544 amplify the received RF signals and a set of M gain and phase control blocks 548 modify the signal level and signal phase for signals to add up coherently. The resulting RF signals are combined and the combined RF signals are down-converted by a pair of mixers 552 to analog baseband. In other embodiments, RF signals are first down-converted into an IF (intermediate frequency) before down-conversion to analog baseband. The analog baseband signals are then converted into digital by a pair of analog-to-digital (ADC) converters 556. The digital baseband signals undergo MIMO detection and digital receive beamforming at module 558 to obtain the two spatial streams $s_1(t), s_2(t)$ signals.

The communication device 508L receives a single spatial stream $s_K(t)$ using two arrays comprising of M antennas 560 each. On each array, M low-noise-amplifiers (LNA) 564 amplify the received RF signals and a set of M gain and phase control blocks 568 modify the signal level and signal phase for signals to add up coherently. The resulting RF signals are combined and the combined RF signals are down-converted by a pair of mixers 572 to analog baseband. In other embodiments, RF signals are first down-converted into an IF (intermediate frequency) before down-conversion to analog baseband. The analog baseband signals are then converted into digital by a pair of analog-to-digital (ADC) converters 576. The digital baseband signals undergo MIMO detection and receive beamforming at module 578 to obtain the spatial stream $s_K(t)$ signal.

Figure 6:
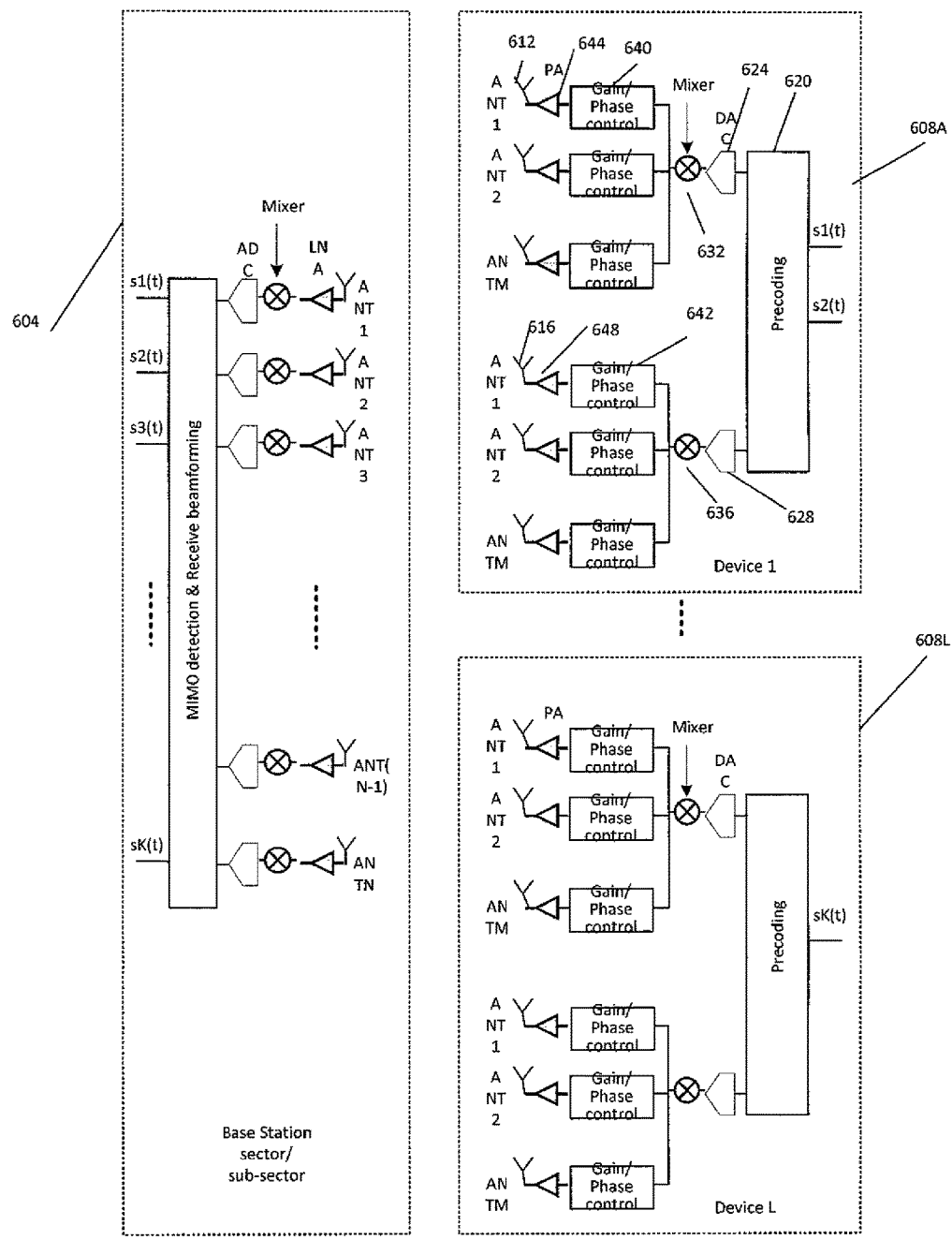
FIG. 6 illustrates a base station sub-sector receiving signals from communication devices.

FIG. 6 illustrates an exemplary base station sub-sector 604 receiving signals from communication devices 608A-608L using digital beamforming while the communication devices 608A-608L use both digital and analog beamforming to transmit signals to the base station sub-sector 604.

Referring to FIG. 6, the communication device 608A transmits two spatial streams $s_1(t), s_2(t)$ using two antenna arrays 612 and 616 comprising of M antennas each. A MIMO precoding processing block 620 maps the two spatial streams digital baseband signals $s_1(t), s_2(t)$ into another set of two digital baseband signals. The digital baseband signals are then converted into analog baseband signals by a pair of digital-to-analog (DAC) converters 624 and 628. Each of the analog baseband signals is up-converted to RF by a pair of mixers 632 and 636. Each of the up-converted RF signals is split into M RF signals. For each antenna array, a set of gain and phase control blocks 640 and 642 modify the signal level and signal phase. On each antenna array, M power amplifiers (PA) 644 and 648 amplify the RF signals for transmission using the antenna arrays 612 and 616.

The communication device 608L transmits a single spatial stream $s_K(t)$ using two arrays 650 and 654 comprising of M antennas each. A precoding processing block 658 maps the single spatial stream digital baseband signals $s_K(t)$ into a set of two digital baseband signals. The digital baseband signals are then converted into analog baseband signals by a pair of digital-to-analog (DAC) converters 662 and 666. Each of the analog baseband signals is up-converted to RF by a pair of mixers 670 and 674. Each of the up-converted RF signals is split into M RF signals. For each antenna array, a set of M gain and phase control blocks 678 and 682 modify the signal level and signal phase. On each antenna array, M power amplifiers (PA) 686 and 690 amplify the RF signals for transmission using the antenna array.

The base station sub-sector 604 receives K spatial streams, $s_1(t), s_2(t), \ldots s_K(t)$, from the communication devices using N antennas 6004. N low-noise-amplifiers (LNA) 6008 amplify the received RF signals. The amplified RF signals are down-converted to baseband by a set of N mixers 6012. In other embodiments, RF signal is first down-converted into an IF (intermediate frequency) before down-conversion to analog baseband. The analog baseband signals are then converted into digital by a set of N analog-to-digital (ADC) converters 6016. The digital baseband signals undergo MIMO detection and beamforming processing at MIMO detection and beamforming block 6020 to obtain the K spatial streams signals $s_1(t), s_2(t), \ldots s_K(t)$.

Figure 7:
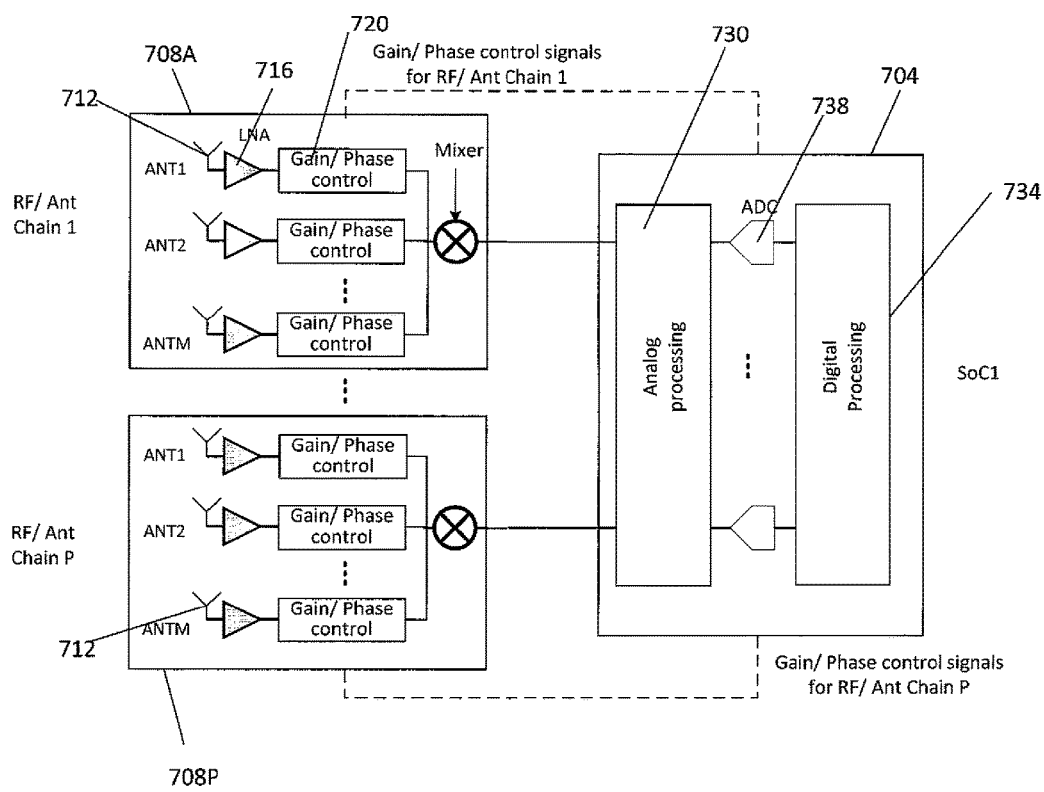
FIG. 7 illustrates analog beamforming gain and phase control in a communication device.

FIG. 7 illustrates analog beamforming gain and phase control in a communication device according to the principles of the present invention. Referring to FIG. 7, a gain/phase control module 704 processes signals received from a plurality of front-end RF/antenna chains 708A-708P and provides gain/phase control signals to the front-end RF/antenna chains 708A-708P for analog beamforming gain and phase control. The front-end RF/antenna chains 708A-708P each includes a plurality of RF/antenna arrays 712. The antennas arrays are coupled to respective low-noise-amplifiers (LNA) 716 which in turn are coupled to respective gain and phase control blocks 720.

In operation, the gain/phase control module 704 processes signals from the front-end RF/antenna chains to derive various signal quality and channel quality metrics such as, for example, RSSI (Received Signal Strength Indicator), EVM (Error Vector Magnitude), SINR (Signal-to-Interference-plus-noise), MIMO channel rank. In response to the derived metrics, the control module 704 applies gain/phase control signals to gain/phase control blocks 720 to adjust gain and phase of the signals to maximize the signal or channel quality metrics. The gain and phase adjustments can be done separately for each array or jointly across arrays. In case of separate adjustments, the signal or channel quality metrics are measured and maximized for each of the arrays separately. In case of joint control of arrays, the signal or channel quality metrics are measured and maximized simultaneously for each array in the device.

According to some disclosed embodiments, a system-on-a-chip (SoC) 728 may implement the gain/phase control module 704. The module may include an analog processing module 730, a digital processing module 734 and DAC/ADC converters 738.

According to disclosed embodiments, the radio base station and the communication devices implement multiple input multiple output (MIMO) transmit and receive antenna arrays at millimeter wave frequencies.

Figures 8A, 8B:
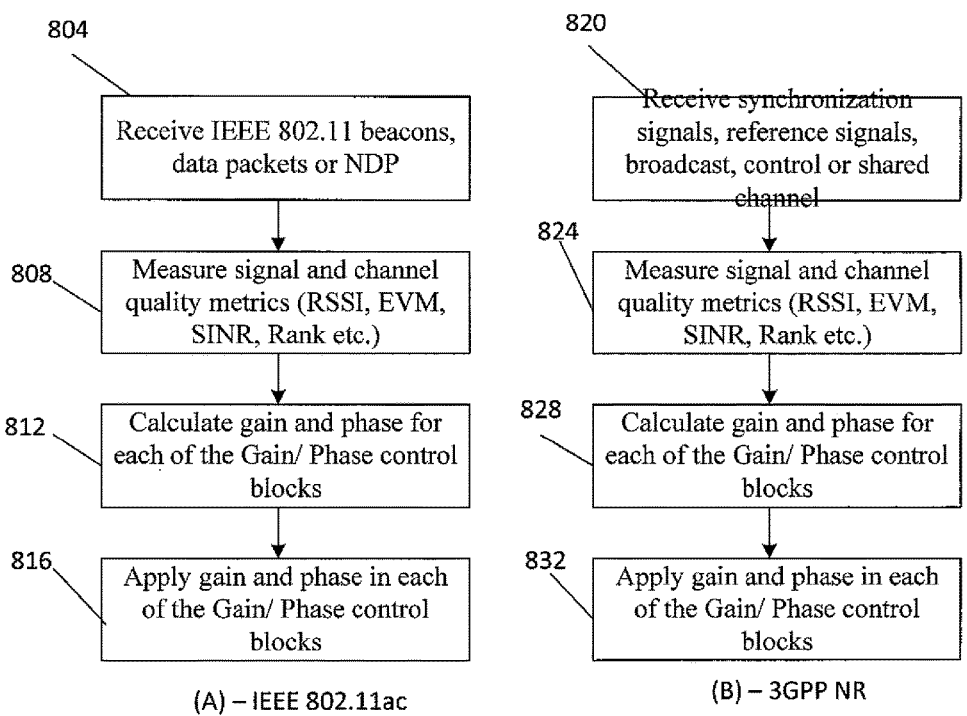
FIGS. 8A and 8B are method flow diagrams for analog beamforming gain and phase control.

FIGS. 8A and 8B are method flow diagrams for analog beamforming gain and phase control in accordance with some disclosed embodiments. FIG. 8A illustrates a method which may be utilized by a communication device that operates in compliance with IEEE 802.11ac standard. FIG. 8B illustrates a method utilized by a communication device that operates in compliance 3GPP NR standard.

Referring to FIG. 8A, in a step 804 the communication device receives beacons, data packets or NDP. In a step 808, the device measures various signal and channel quality metrics such as RSSI, EVM, SINR, and MIMO channel rank from received beacons, data packets or NDP. In a step 812, the device calculates gain and phase. For example, the device may calculate gain and phase for the gain/phase control blocks illustrated in FIG. 7. In a step 816 the device applies the gain and phase to the gain and phase control blocks to adjust the gain and phase of the signals to maximize the metrics.

Now referring to FIG. 8B, in a step 820 the communication device receives synchronization signals, reference signals, broadcast, control or shared channel. In a step 824 the communication device measures various signal and channel quality metrics such as RSSI, EVM, SINR, and MIMO channel rank from received synchronization signals, reference signals, broadcast, control or shared channel. In a step 828 the device calculates gain and phase. In a step 832 the device applies the gain and phase to the gain and phase control blocks.

Figure 9:
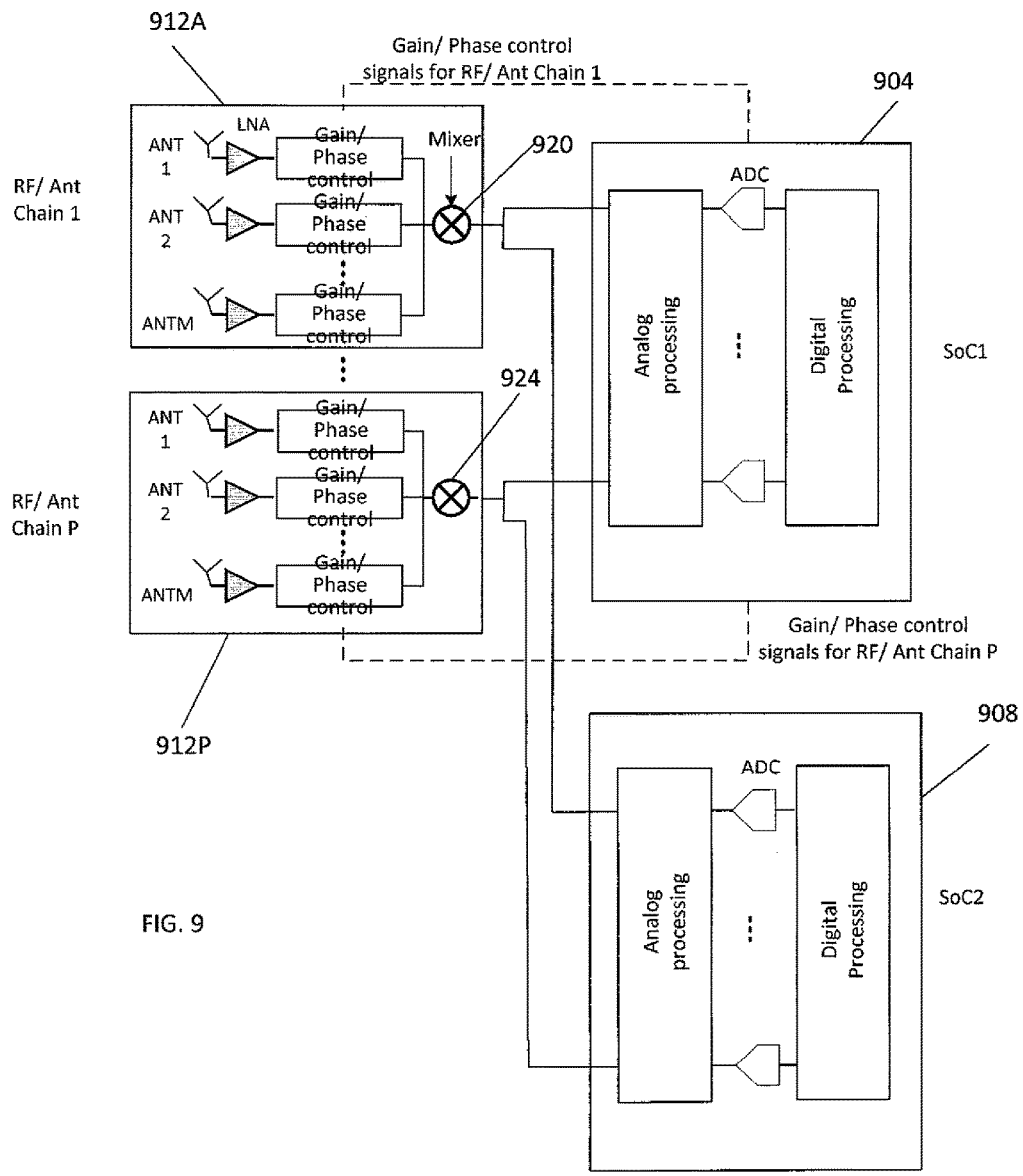
FIG. 9 illustrates a system for gain/phase control.

According to some disclosed embodiments, a plurality of gain/phase control modules may process signals received from a plurality of front-end RF/antenna chains. Referring to FIG. 9, two gain/phase control modules 904 and 908 process signals receive from a plurality of front-end RF/antenna chains 912A-912P and provide gain/phase control signals to the front-end RF/antenna chains 912A-912P for analog beamforming gain and phase control. Although FIG. 9 illustrates only two gain/phase control modules, the principles of the invention are applicable to more than two gain/phase control modules.

According to some disclosed embodiments, two system-on-chips (SoCs) may implement the gain/phase control modules 904 and 908. The multiple SoCs, for example, are used to support multi-carrier reception and transmission where each SoC processes one or more carrier. For example, in the case of EEE 802.11ac standard, each SoC can process 20, 40, 80, or 160 MHz channel. With multiple SoCs embedded in the device, the device can support larger bandwidths for data communications.

As illustrated in FIG. 9, down-converted analog signals at the output of mixers 920 and 924 are split and provided to each of the SoCs (SoC1 and SoC2). In this case, only the primary SoC, SoC1 in this example, is used to adjust the gain and phase of the signals to point its beam towards the desired base station. The other SoCs in the device then use the same settings as the beam is pointed towards the desired base station for all SoCs in the device.

Figure 10:
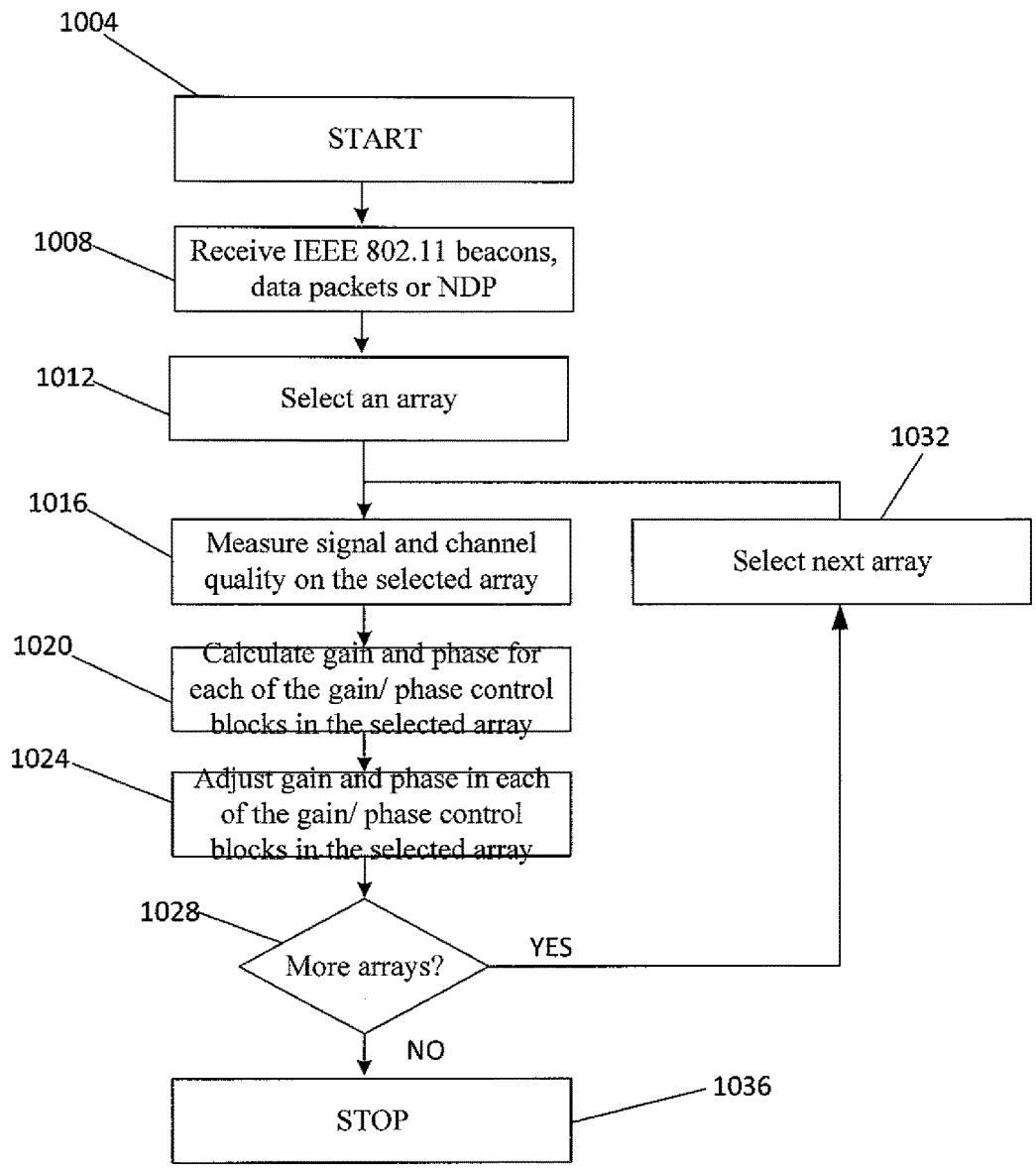
FIGS. 10 and 11 are method flow diagrams for analog beamforming gain and phase control.

FIG. 10 is a method flow diagram for analog beamforming gain and phase control according to which measurements and control for each subarray are performed separately. Although the exemplary embodiment is described for IEEE 802.11 standard, the principles disclosed herein applies to 3GPP NR standard as well.

Referring to FIG. 10, the flow begins in a step 1004 and in a step 1008 IEEE 802.11 beacons, data packets or NDP are received by a communication device. In a step 1012 an antenna array is selected. By way of example, the embodiment illustrated in FIG. 7 features the front-end RF/antenna chains 708A-708P wherein each front-end RF/antenna chain includes antenna arrays ANT-1-ANT-M. Each of the antenna arrays is coupled to a gain/phase control block via a low noise amplifier (LNA).

In a step 1016 signal and channel quality metrics in the selected array are measured. The measured metrics may, for example, include RSSI (Received Signal Strength Indicator), EVM (Error Vector Magnitude), SINR (Signal-to-Interference-plus-noise), MIMO channel rank etc. In a step 1020 the measured metrics are used to calculate gain and phase for the control block associated with the array, and in a step 1024, the gain and phase of the control block is adjusted. More specifically, the gain and phase of the signals in the first array are adjusted to maximize the signal or channel quality metrics.

In a step 1028 a determination is made if there are more arrays, and if there are more arrays in a step 1032 the next array is selected and the flow returns to step 1016. Thus, the algorithm continues to make measurements and adjust gain and phase of the signals on the remaining arrays. If there are no more arrays, the flow terminates in a step 1036.

Figure 11:
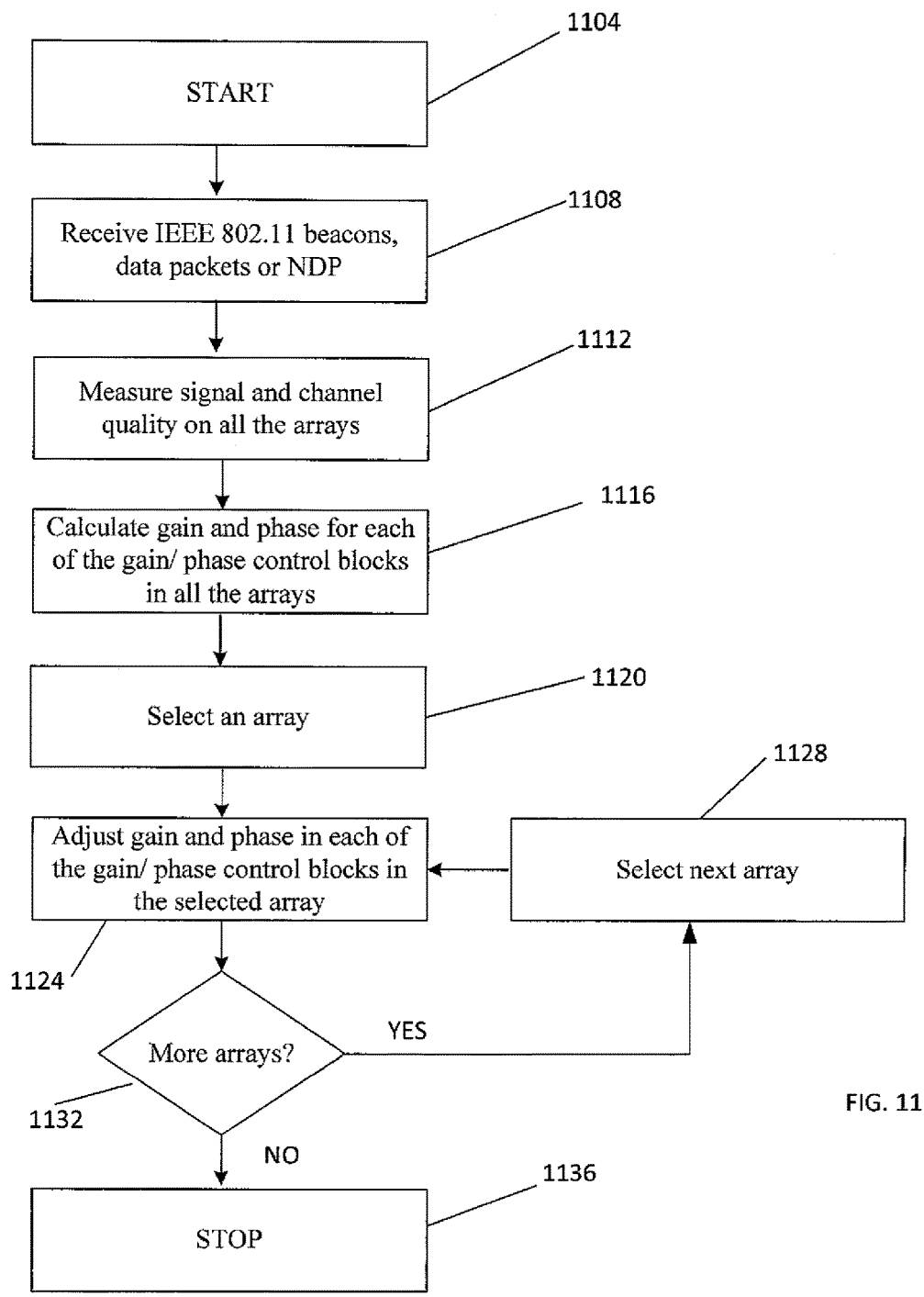

FIG. 11 is a method flow diagram for analog beamforming gain and phase control in accordance with another embodiment of the invention wherein measurements and calculation of gain/phase are made jointly across all arrays. Referring to FIG. 11, the flow begins in a step 1104, and in a step 1108 beacons, data packets or NDP are received. In a step 1112 signal and channel quality metrics are measured on all the arrays, and in a step 1116 gain and phase for each gain/phase control blocks are calculated for the arrays. In a step 1120 an array is selected and in a step 1124 the gain and phase of the control blocks in the selected array are adjusted. In a step 1132 a determination is made if there are more arrays. If there are more arrays the flow moves to a step 1128 where the next array is selected and the flow returns to the step 1124. Otherwise, the flow moves to a step 1136 where the flow is terminated.

Figure 12:
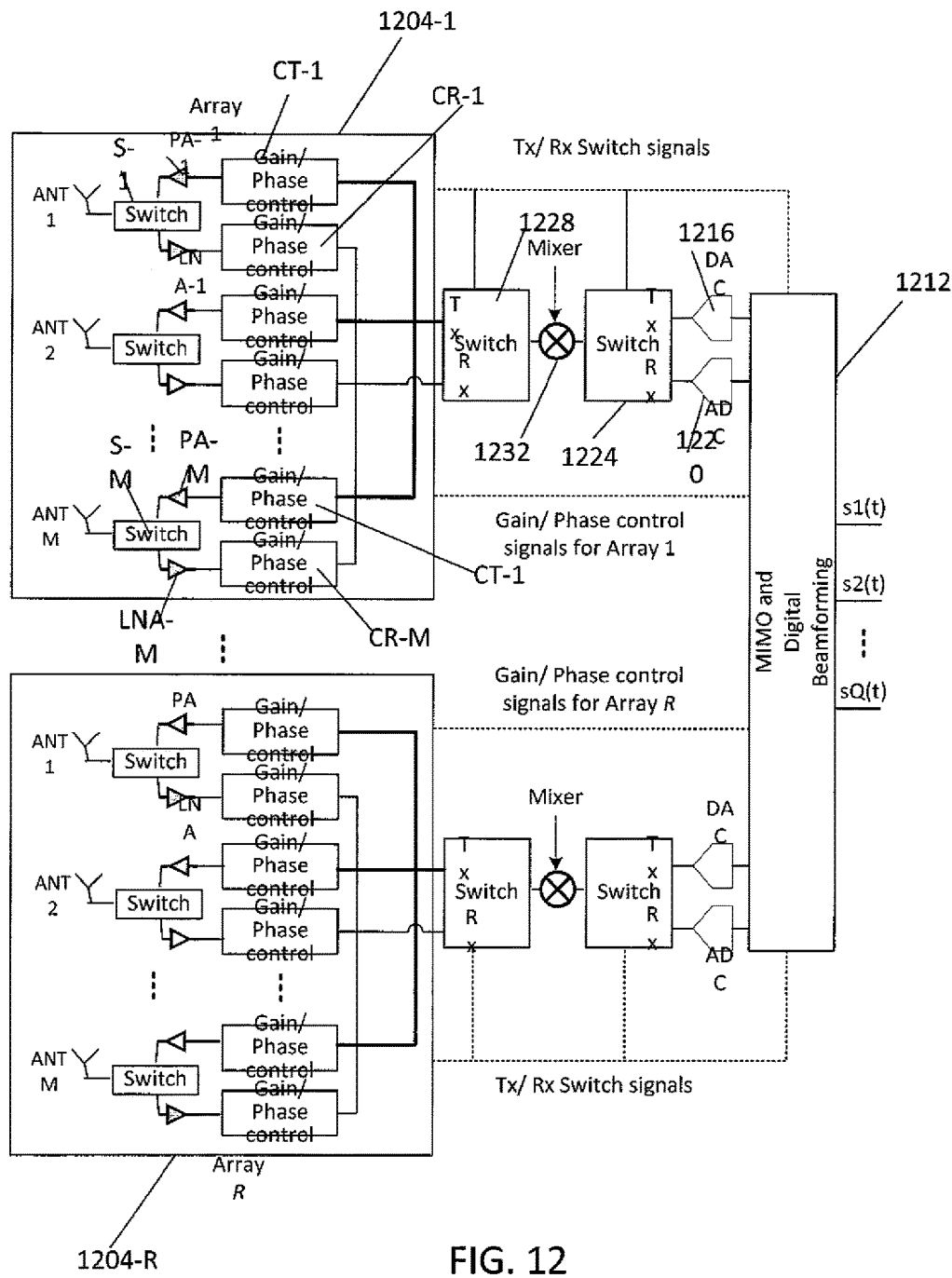
FIG. 12 illustrates a circuit for analog beamforming.

FIG. 12 illustrates a circuit comprising front-end RF/antenna blocks coupled to a MIMO and digital beamforming module for analog beamforming gain and phase control in accordance with yet another disclosed embodiment. The circuit illustrated in FIG. 12 may be utilized in a communication device for analog beamforming gain and phase control.

Referring to FIG. 12, R analog beamforming antenna arrays 1204-1-1204-R, also referred to as front-end RF/antenna arrays, are shared for reception and transmission of Q spatial streams signals, $s_1(t)$, $s_2(t)$, ... $s_Q(t)$. Each of the antenna arrays 1204-1-1204-R comprises M antennas ANT-1-ANT-M, M low-noise-amplifiers (LNA) LNA-1-LNA-M, M power amplifiers, M transmit/receive RF switches S-1-S-M, M gain and phase control blocks CT-1-CT-M for transmit paths and M gain and phase control blocks CR-1-CR-M for receive paths. During a transmit mode the switch S-1 electrically connects the gain/phase control block CT-1 to the antenna ANT-1, and during a receive mode the switch S-1 electrically connects the gain/phase control block CR-1 to the antenna ANT-1 via the low noise amplifier (LNA) LNA-1.

A MIMO and digital beamforming module 1212 performs analog and digital processing on the signals received by the arrays to derive various signal quality and channel quality metrics such as RSSI (Received Signal Strength Indicator), EVM (Error Vector Magnitude), SINR (Signal-to-Interference-plus-noise), MIMO channel rank etc. A system on chip (SoC) may implement the module 1212. The received signals from the array 1204-1 are transferred to the module 1212 for processing via switches 1216, 1228, a mixer 1224 and ADC 1220, while transmit signals from the module 1212 are transferred to the array 1204-1 via a DAC 1216, the switches 1228, 1224 and the mixer 1232.

In response to the measured signal quality and channel quality, the module 1212 generates gain/phase control signals which are applied to the gain/phase control blocks (e.g., CT-1, CR-1, CT-2, CR-2, etc.) to adjust gain and phase of the signals in the R arrays to maximize the signal or channel quality metrics. The gain and phase values that maximize the received signal or channel quality from a desired base station also maximizes the transmit signal towards the desired base station due to channel reciprocity. Therefore, when the communication device transmits spatial stream signals to the base station, the gain and phase values can be kept the same as for signal reception.

The principles of the current invention are described for analog beamforming at the carrier or radio frequency (RF) signals. In other embodiments, the analog beamforming can be performed on analog baseband signals or intermediate-frequency (IF) signals. In yet other embodiments, the analog beamforming can be performed by controlling the phase of the local oscillator (LO) signals used in the up-conversion or down-conversion mixers.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Those skilled in the art to which this application relates will appreciate that other and further additions, deletions, substitutions and modifications may be made to the described embodiments.

The invention claimed is:

1. A communication system comprising:
a radio base station configured to transmit and receive signals using digital beamforming, wherein the radio base station does not apply analog beamforming; and
a wireless communication device configured to transmit and receive signals using analog and digital beamforming, wherein the wireless communication device comprises:
a plurality of antenna arrays configured to receive the signals;
a plurality of first modules configured to form beams in the analog domain by measuring signal and channel quality metrics from the received signals and calculating gain and phase adjustment values, the first modules adjusting the gain and phase of the received signals; and
a second module configured to form beams in the digital domain by generating digital weights and applying the digital weights to the gain and phase adjusted received signals.

2. The communication system of claim 1, wherein the measured metric is a received signal strength indicator (RSSI).

3. The communication system of claim 1, wherein the measured metric is an error vector magnitude (EVM).

4. The communication system of claim 1, wherein the measured metric is SINR.

5. The communication system of claim 1, wherein the measured metric is a MIMO channel rank.

6. The communication system of claim 1, wherein the signal and channel quality metrics are measured from received synchronization signals.

7. The communication system of claim 1, wherein the signal and channel quality metrics are measured from reference signals.

8. The communication system of claim 1, wherein the signal and channel quality metrics are measured from broadcast, control or shared channels.

9. The communication system of claim 1, wherein the communication device is a mobile phone.

10. The communication system of claim 1, wherein the communication device is a computer.

11. A wireless communication device, comprising:
a first module configured to form beams in the digital domain by generating digitally pre-coded spatial streams;
a plurality of second modules configured to form beams in the analog domain by measuring signal and channel quality metrics from received signals and calculating gain and phase adjustment values, the second modules adjusting the gain and phase of the digitally pre-coded spatial streams; and
a plurality of antenna arrays configured to transmit the digitally pre-coded spatial streams,
wherein a radio base station receives and applies digital beamforming to the spatial streams, wherein the radio base station does not apply analog beamforming.

12. The wireless communication device of claim 11, wherein a pre-coding matrix is applied to a plurality of spatial streams to generate the pre-coded spatial streams.

13. The communication device of claim 11, wherein the antenna arrays are connected to respective low noise amplifiers and power amplifiers.

14. The communication device of claim 11, wherein the communication device is a mobile phone.

15. The communication device of claim 11, wherein the communication device is a computer.

16. A method, comprising:
receiving signals by a plurality of antenna arrays in a wireless communication device, wherein the signals are transmitted by a radio base station using digital beamforming, wherein the radio base station does not apply analog beamforming;
measuring, by the wireless communication device, signal and channel quality metrics from the received signals and calculating gain and phase adjustment values;

forming beams in the analog domain, by the wireless communication device, by adjusting the gain and phase of the received signals; and forming beams in the digital domain, by the wireless communication device, by generating digital weights and applying the digital weights to the gain and phase adjusted received signals.

17. The method of claim 16, wherein the received signals include IEEE 802.11 beacons, data packets or null data packets.

18. The method of claim 16, wherein the measured metric is a received signal strength indicator (RS SI).

19. The method of claim 16, wherein the measured metric is an error vector magnitude (EVM).

20. The method of claim 16, wherein the measured metric is SINR.

21. The method of claim 16, wherein the metric is a MIMO channel rank.

22. The method of claim 16, wherein the signal and channel quality metrics are measured from received synchronization signals.

23. The method of claim 16, wherein the signal and channel quality metrics are measured from reference signals.

24. The method of claim 16, wherein the signal and channel quality metrics are measured from broadcast, control or shared channels.

* * * * *